US009743578B2

(12) United States Patent
Blomme et al.

(10) Patent No.: US 9,743,578 B2
(45) Date of Patent: *Aug. 29, 2017

(54) AGRICULTURAL DEVICES, SYSTEMS, AND METHODS FOR DETERMINING SOIL AND SEED CHARACTERISTICS AND ANALYZING THE SAME

(71) Applicant: Kinze Manufacturing, Inc., Williamsburg, IA (US)

(72) Inventors: Laura B. Blomme, Williamsburg, IA (US); Courtney N. Achen, Iowa City, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 161 days.

This patent is subject to a terminal disclaimer.

(21) Appl. No.: 14/566,790

(22) Filed: Dec. 11, 2014

(65) Prior Publication Data

US 2015/0094917 A1  Apr. 2, 2015

Related U.S. Application Data

(63) Continuation of application No. 13/458,012, filed on Apr. 27, 2012, now Pat. No. 8,935,986.

(Continued)

(51) Int. Cl.
| | |
|---|---|
| *A01B 49/06* | (2006.01) |
| *A01C 5/06* | (2006.01) |
| *A01C 21/00* | (2006.01) |

(52) U.S. Cl.
CPC ............ *A01C 21/005* (2013.01); *A01B 49/06* (2013.01); *A01C 5/062* (2013.01)

(58) Field of Classification Search
CPC ......... A01B 49/06; A01B 49/04; A01B 49/00; A01B 71/02; A01B 71/00; A01B 79/005;
(Continued)

(56) References Cited

U.S. PATENT DOCUMENTS

| 3,749,035 A | 7/1973 | Cayton et al. |
| 4,085,862 A * | 4/1978 | Steffen .................. A01C 7/105 |
| | | 111/180 |

(Continued)

FOREIGN PATENT DOCUMENTS

GB    2126062    3/1984

OTHER PUBLICATIONS

Kinze Manufacturing, Inc., PCT/US2012/035563, "International Search Report and Written Opinion", 11 pages dated Jul. 13, 2012.
(Continued)

*Primary Examiner* — Christopher J Novosad
(74) *Attorney, Agent, or Firm* — McKee, Voorhees & Sease, PLC

(57) ABSTRACT

Agricultural seed planting systems are provided. In some aspects, the system includes a processing unit, a frame, a furrow opener coupled to the frame for opening a furrow in soil, and a sensor in communication with the processing unit and adapted to sense a characteristic associated with seed planting. The sensor may generate a signal associated with the sensed characteristic and the processing unit may receive the signal. In some aspects, the sensed characteristic may be either a soil characteristic or a seed characteristic. Information associated with the sensed characteristic can be saved in memory for future use and to assist with more effective planting in the future.

20 Claims, 4 Drawing Sheets

Related U.S. Application Data

(60) Provisional application No. 61/479,540, filed on Apr. 27, 2011, provisional application No. 61/479,537, filed on Apr. 27, 2011, provisional application No. 61/479,543, filed on Apr. 27, 2011.

(58) Field of Classification Search
CPC ..... A01B 79/00; A01B 63/008; A01B 63/002; A01B 63/00; A01C 5/062; A01C 5/06; A01C 5/00; A01C 5/064; A01C 7/203; A01C 7/201; A01C 7/20; A01C 7/00; A01C 7/205; A01C 21/005; A01C 21/00; Y10S 111/90; Y10S 111/00; Y10S 111/903
USPC ................ 111/134–137, 164, 190–195, 200; 172/239, 395, 397, 421, 538, 539; 701/50
See application file for complete search history.

(56) References Cited

U.S. PATENT DOCUMENTS

| | | | |
|---|---|---|---|
| 4,413,685 A | 11/1983 | Gremelspacher et al. | |
| 4,766,962 A | 8/1988 | Frase | |
| 4,923,015 A * | 5/1990 | Barsby | E02F 9/2025 172/4.5 |
| 5,529,128 A | 6/1996 | Peterson et al. | |
| 5,544,709 A | 8/1996 | Lowe et al. | |
| 5,563,340 A | 10/1996 | Clowater et al. | |
| 5,621,666 A | 4/1997 | O'Neall et al. | |
| 5,915,313 A * | 6/1999 | Bender | A01B 79/005 111/178 |
| 6,016,714 A | 1/2000 | Smith et al. | |
| 6,070,539 A * | 6/2000 | Flamme | A01B 79/005 111/177 |
| 6,148,747 A | 11/2000 | Deckler et al. | |
| 6,216,794 B1 | 4/2001 | Buchl | |
| 6,389,999 B1 | 5/2002 | Duello | |
| 6,701,857 B1 | 3/2004 | Jensen et al. | |
| 7,025,009 B2 | 4/2006 | Roibier | |
| 7,316,189 B2 | 1/2008 | Fountain et al. | |
| 7,392,754 B2 | 7/2008 | Flikkema et al. | |
| 7,628,218 B2 | 12/2009 | Cresswell | |
| 7,726,251 B1 | 6/2010 | Peterson et al. | |
| 7,849,955 B2 | 12/2010 | Crabill et al. | |
| 8,078,367 B2 | 12/2011 | Sauder et al. | |
| 8,365,697 B2 | 2/2013 | Cleeves | |
| 8,418,636 B2 | 4/2013 | Liu et al. | |
| 8,909,436 B2 * | 12/2014 | Achen | A01C 5/062 111/134 |
| 8,924,092 B2 * | 12/2014 | Achen | A01B 49/04 111/200 |
| 8,935,986 B2 * | 1/2015 | Blomme | A01C 5/062 111/164 |
| 2007/0272134 A1 | 11/2007 | Baker et al. | |
| 2008/0011207 A1 * | 1/2008 | Kryzak | A01H 4/001 111/100 |
| 2009/0112475 A1 | 4/2009 | Christy et al. | |
| 2010/0023430 A1 | 1/2010 | Hunter et al. | |
| 2010/0198529 A1 | 8/2010 | Sauder et al. | |
| 2012/0042813 A1 | 2/2012 | Liu et al. | |
| 2012/0046838 A1 | 2/2012 | Landphair et al. | |

OTHER PUBLICATIONS

Kinze Manufacturing, Inc., PCT/US2012/035518, "International Search Report and Written Opinion", 9 pages dated Jul. 13, 2012.
Kranner et al., "Noninvasive Diagnosis of Seed Viability Using Infrared Thermography", Proceedings of the National Academy of Sciences, vol. 107, No. 8, pp. 3912-3917, Feb. 23, 2010.

* cited by examiner

AGRICULTURAL DEVICES, SYSTEMS, AND METHODS FOR DETERMINING SOIL AND SEED CHARACTERISTICS AND ANALYZING THE SAME

CROSS-REFERENCE TO RELATED APPLICATIONS

This application is a Continuation Application of U.S. Ser. No. 13/458,012 filed Apr. 27, 2012, which claims priority under 35 U.S.C. §119 to U.S. Provisional Patent Application Nos. 61/479,540, filed Apr. 27, 2011, 61/479,537, filed Apr. 27, 2011, and 61/479,543, filed Apr. 27, 2011, all of which are incorporated by reference in their entirety.

FIELD OF THE INVENTION

The present invention generally relates to agricultural devices, systems, and methods and, more particularly, to agricultural devices, systems, and methods for determining soil and seed characteristics and analyzing the same.

BACKGROUND

Agricultural planters for planting seeds have been utilized for years to plant seeds in soil. Such planters include a plurality of row units, each of which is adapted to plant a row of seeds in the soil. Each row unit opens a furrow, singulates seeds into the furrow, and closes the furrow over the seeds. Some conventional row units include a sensor for sensing the seeds in a furrow. Such conventional row units sense the presence of the seeds in an effort to identify individual seeds and determine positioning of the seeds in the furrow. Tracking seeds in this fashion can be inaccurate.

SUMMARY

In one example, a system for determining at least one soil characteristic and analyzing the same is provided.

In another example, a system for determining at least one seed characteristic and analyzing the same is provided.

In yet another example, a system for determining at least one soil characteristic and at least one seed characteristic and analyzing the same is provided.

In still another example, a system for determining one or both of a soil characteristic and a seed characteristic is provided and includes a tractor, an agricultural device pulled by the tractor, and a sensor coupled to the agricultural device for sensing the one or both of the soil characteristic and the seed characteristic.

In a further example, a method for determining at least one soil characteristic and analyzing the same is provided.

In yet a further example, a method for determining at least one seed characteristic and analyzing the same is provided.

In still a further example, a method for determining at least one soil characteristic and at least one seed characteristic and analyzing the same is provided.

In another example, a method for determining one or both of a soil characteristic and a seed characteristic is provided and includes providing a tractor, providing an agricultural device pulled by the tractor, and providing a sensor coupled to the agricultural device for sensing the one or both of the soil characteristic and the seed characteristic.

In yet another example, an agricultural seed planting system is provided and includes a processing unit, a frame, a furrow opener coupled to the frame for opening a furrow in soil, and a sensor in communication with the processing unit and adapted to sense a characteristic associated with seed planting, wherein the sensor generates a signal associated with the sensed characteristic and the processing unit receives the signal.

In still another example, an agricultural seed planting system is provided and includes a processing unit, a frame, a furrow opener coupled to the frame for opening a furrow in soil, and a sensor in communication with the processing unit and adapted to sense a soil moisture, wherein the sensor generates a signal associated with the soil moisture and the processing unit receives the signal.

In a further example, an agricultural seed planting system is provided and includes a processing unit, a frame, a furrow opener coupled to the frame for opening a furrow in soil, a first sensor for sensing a first characteristic associated with seed planting, wherein the first sensor generates a first signal associated with the sensed first characteristic and the processing unit receives the first signal, and a second sensor adapted to sense a second characteristic associated with seed planting, wherein the second sensor generates a second signal associated with the sensed second characteristic and the processing unit receives the second signal.

In yet a further example, a method of planting seeds with an agricultural planter is provided. The method including opening a furrow with a furrow opener, placing a seed in the furrow with the agricultural planter, sensing a characteristic of seed planting with a sensor, generating a signal associated with the sensed characteristic with the sensor, communicating the signal to a processing unit, storing information associated with the signal in a memory, retrieving the information from the memory subsequent to storing the information, and utilizing the retrieved information prior to placing a second seed in a furrow.

Figure 1:
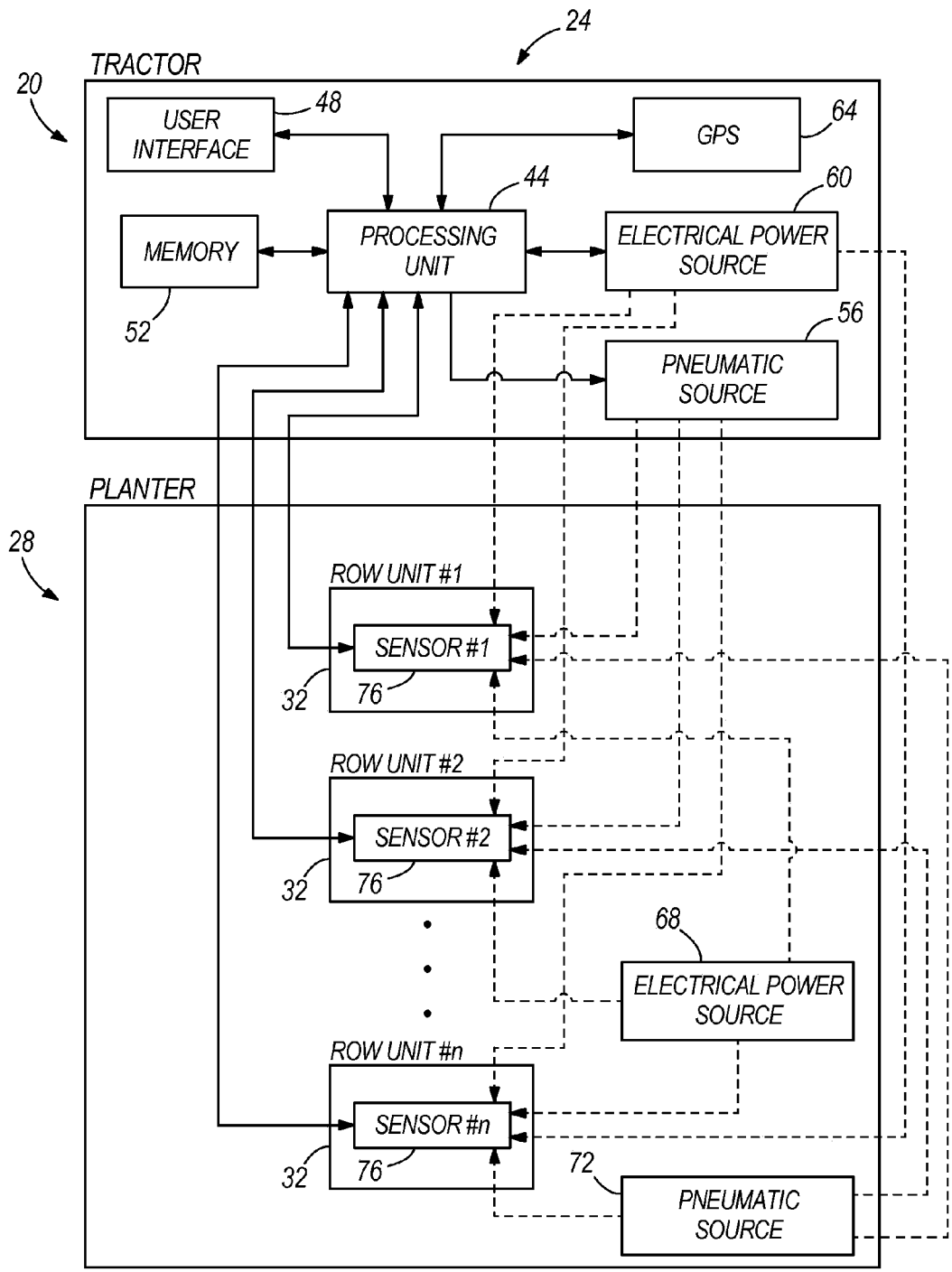
FIG. 1 is a diagram of an exemplary system for determining soil and seed characteristics.

Before any independent features and embodiments of the invention are explained in detail, it is to be understood that the invention is not limited in its application to the details of the construction and the arrangement of the components set forth in the following description or illustrated in the drawings. The invention is capable of other embodiments and of being practiced or of being carried out in various ways. Also, it is understood that the phraseology and terminology used herein is for the purpose of description and should not be regarded as limiting.

DETAILED DESCRIPTION

The contents of U.S. patent application Ser. No. 13/457,815, filed Apr. 27, 2012, entitled "DOWN AND/OR UP FORCE ADJUSTMENT SYSTEM", and U.S. patent application Ser. No. 13/457,577, filed Apr. 27, 2012, entitled "REMOTE ADJUSTMENT OF A ROW UNIT OF AN AGRICULTURAL DEVICE", are both incorporated herein by reference.

Soil and seed characteristics are important when planting a crop and may have a direct impact on the efficiency of the planting process and ultimately on the crop yield. Some of such soil characteristics include, but are not limited to, soil temperature, soil moisture, soil type, soil nutrients, etc. Soil temperature directly impacts germination of the seeds planted in the soil. If the soil temperature is not at a sufficient level, the seeds will not germinate. In addition, the soil must be at an appropriate temperature for a sufficient period of time in order for the seeds to germinate. Regarding soil moisture, seeds need to be enveloped within soil having an adequate moisture content in order for germination to occur. Soil moisture content may vary at different soil depths and placement of the seeds into optimum soil moisture conditions will promote optimum and uniform growth of the plants resulting from the seeds and ultimately maximize crop yield. As indicated above, seed characteristics may also be important in the planting process. Seed characteristics such as, for example, seed spacing, seed location within the furrow, seed temperature, and a variety of other seed characteristics may be important to the planting process. Information relating to soil and seed characteristics may be gathered, stored, and analyzed for future planting processes. Such historical information may be used by farmers in future to potentially realize higher crop yields.

With reference to FIG. 1, an exemplary system 20 for determining soil and seed characteristics and analyzing the same is illustrated. The system 20 is capable of determining a wide variety of soil and seed characteristics and analyzing the soil and seed characteristics to optimize crop yield. In some exemplary embodiments, the system 20 is capable of determining and analyzing soil temperatures. In other exemplary embodiments, the system 20 is capable of determining and analyzing soil moistures. In further exemplary embodiments, the system 20 is capable of determining the presence and location of seeds in the soil and analyzing the same. In still further embodiments, the system 20 is capable of determining and analyzing more than one soil and/or seed characteristic. For example, the system 20 may determine and analyze soil temperature and soil moisture. It should be understood that the system 20 is capable of determining and analyzing any number and any combination of soil and seed characteristics and still be within the intended spirit and scope of the present invention.

With continued reference to FIG. 1, the exemplary system 20 includes a tractor 24 and an agricultural device 28 used for the planting process. The agricultural device 28 may be a wide variety of different agricultural devices used for the planting process and all of such planting devices are intended to be within the spirit and scope of the present invention. In the illustrated exemplary embodiment, the agricultural device is a planter 28 including a plurality of row units 32, each of which is capable of opening the soil by creating a furrow 36 (see FIGS. 2 and 3), planting seeds 40 (see FIG. 2) in the furrow 36, and covering the planted seeds 40 with soil by closing the furrow 36.

The tractor 24 couples to the planter 28 and is adapted to pull the planter 28 through a field to plant a crop. In the illustrated exemplary embodiment, the tractor 24 includes a processing unit 44, a user interface 48, memory 52, a pneumatic source 56, an electrical power source 60, and a global positioning system (GPS) 64. The tractor 24 is capable of including other mechanical and electrical components and all of such components are intended to be within the intended spirit and scope of the present invention.

The processing unit 44 performs the necessary processing to achieve the desired functionality of the system 20 (described in more detail below) and communicates with the input devices, output devices, memory, the tractor and the agricultural device (e.g., the planter) as necessary to achieve such desired functionality. The user interface 48 is an exemplary output device that may include audio and video capabilities to enable a user to hear and see information. The tractor electrical power source 60 may provide the components of the tractor 24 requiring electrical power with sufficient electrical power to enable operation of the electrical components. Similarly, the tractor pneumatic source 56 may provide the components of the tractor 24 requiring pneumatics with sufficient pneumatics to enable operation of the pneumatic components. The GPS 64 may be a conventional GPS system and may communicate with the processing unit 44 to achieve desired functionality of the system 20 (described in more detail below).

With continued reference to FIG. 1, the planter 28 includes a plurality of row units 32, an electrical power source 68, and a pneumatic source 72. The planter 28 may include any number of row units 32, which is exemplified in FIG. 1 by the annotations: Row Unit #1; Row Unit #2; . . . ; Row Unit #n. The row units 32 may be substantially the same in construction and functionality. In some exemplary embodiments, the planter electrical power source 68 may provide the components of the planter 28 requiring electrical power with sufficient electrical power to enable operation of the electrical components. Similarly, in some exemplary embodiments, the planter pneumatic source 72 may provide the components of the planter 28 requiring pneumatics with sufficient pneumatics to enable operation of the pneumatic components.

In the illustrated exemplary embodiment, each row unit 32 includes a row unit sensor 76. In other exemplary embodiments, each row unit 32 may include any number of row unit sensors 76 (see FIG. 5). Returning to the illustrated embodiment, the sensors 76 are capable of sensing a wide variety of soil and seed characteristics such as, for example, soil temperature, soil moisture, seed presence, seed temperature, etc. In some exemplary embodiments, the sensors 76 on the various row units 32 may sense the same characteristic. In other exemplary embodiments, the sensors 76 on the various row units 32 may sense different characteristics. The sensors 76 may require electrical power to operate and such electrical power may originate from a variety of different sources. In some exemplary embodiments, the sensors 76 may be electrically powered by the planter electrical power source 68. In other exemplary embodiments, the sensors 76 may be electrically powered by the tractor electrical power source 60.

The above described electrical power sources 60, 68 may be a wide variety of types of electrical power sources and all of such various electrical power sources are intended to be within the intended spirit and scope of the present invention. For example, an electrical power source may comprise any one of the following: an alternator coupled with a hydraulic motor; an alternator coupled mechanically to an engine of the tractor; an alternator coupled with a ground drive; an alternator coupled with an electric motor; a battery pack; or any other appropriate electrical source.

While the system 20 is utilized during the planting process, dust, dirt, and other debris may become airborne due to the turbulence created by the tractor 24 and planter 28. If debris accumulates on the sensors 76, the efficacy of the sensors 76 may deteriorate. The system 20 may include a protective member 80 (see FIG. 3) coupled to each sensor 76 to inhibit accumulation of debris on the sensors 76. The protective member 80 may include an air inlet 84 through which pressurized air enters the protective member 80. The pressurized air blows past the sensor 76 to dislodge any accumulated debris and to inhibit debris from settling on the sensor 76. The pressurized air exits the protective member 80 through an open bottom end 88 of the protective member 80. Blowing of pressurized air out through the open bottom end 88 inhibits debris from rising up into the protective member 80 and accessing the sensor 76. In some exemplary embodiments, the air may be pressurized at about 5 pounds per square inch (psi). In other exemplary embodiments, the air may be pressurized within a range of about 0.5 psi to about 250 psi.

The pressurized air may originate from a variety of different sources. In some exemplary embodiments, the pressurized air may originate from the planter pneumatic source 72. In other exemplary embodiments, the pressurized air may originate from the tractor pneumatic source 56.

Figure 2:
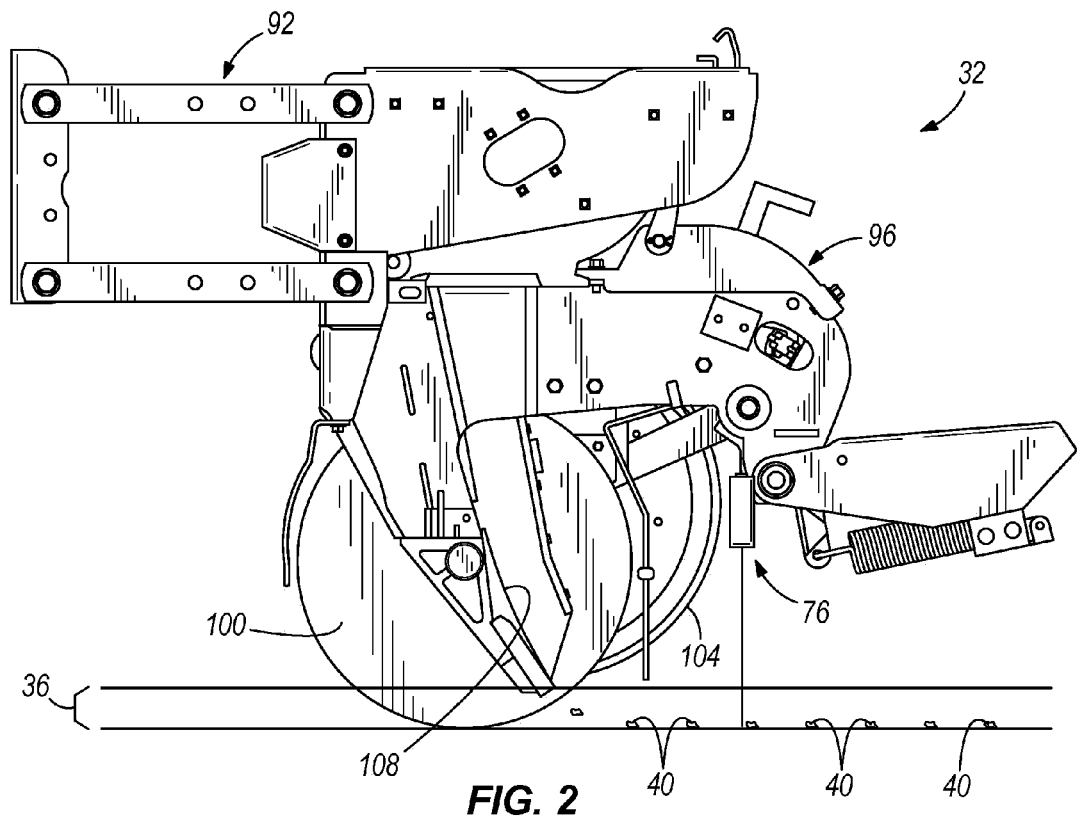
FIG. 2 is a side elevation view of an exemplary agricultural row unit of the system shown in FIG. 1, the row unit includes an exemplary sensor for sensing one or more soil and/or seed characteristics.

Referring now to FIG. 2, an exemplary row unit 32 and an exemplary sensor 76 of the system 20 are illustrated. The exemplary illustrated embodiments of the row unit 32 and the sensor 76 are not intended to be limiting. The system 20 may include other embodiments of row units 32 and sensors 76 and all of such embodiments are intended to be within the spirit and scope of the present invention.

In the illustrated exemplary embodiment, the exemplary row unit is a planter row unit 32, which is capable of planting seeds 40 in the soil. For simplicity, only one planter row unit 32 is illustrated and described herein. However, it should be understood that the exemplary planter 28 is capable of having any number of planter row units 32 and such numerous row units 32 may be similarly configured and have similar functionality to the illustrated and described exemplary planter row unit 32.

With continued reference to FIG. 2, the illustrated exemplary planter row unit 32 may be coupled to a frame or toolbar (not shown) of a tractor 24 by a coupling 92. The row unit 32 may include a frame 96 coupled to the coupling 92, a furrow opener or pair of flat circular disc blades 100 (only one shown) coupled to the frame 96 to open a seed trench or furrow 36 in the soil, a pair of depth gauge wheels 104 (only one shown behind the disc blade 100) coupled to the frame 96 and located adjacent to and slightly to a rear of the blades 100, a seed meter (not shown) which "singulates" seed 40 from a seed hopper (not shown) and deposits the seed 40, via a seed tube 108, into the furrow 36 formed by the twin disc opener blades 100, and a pair of spaced apart closing wheels (not shown) coupled to the frame 96 and positioned to follow after the planted seed 40 for breaking down the furrow side walls on either side of the furrow 36 and covering the seed 40, closing the furrow 40, and firming the soil over the covered seed 40. The gauge wheels 104 determine, at least in part, the depth of the furrow 36 formed by the opener blades 100.

The sensor 76 may be coupled to the row unit 32 in any manner and at any location. For example, the sensor 76 may be fastened, welded, adhered, bonded, unitarily formed with, or any other manner of coupling, to the row unit 32. Additionally, the sensor 76 may be coupled to a variety of different components of the row unit 32 such as, for example, the frame 96, the seed tube 108, or any other portion of the row unit 32. Further, the sensor 76 may be coupled to the row unit 32 at a variety of different locations such as, for example, a location following the seed tube 108, a location preceding the seed tube 108, a location spaced relatively high above the soil, a location spaced relatively close to the soil, a location between the opening blades 100 and the closing wheels, or any other location relative to the row unit 32. Further yet, the sensor 76 may be directed in a variety of different directions. For example, the sensor 76 may be directed straight downward, angled forward, angled rearward, or any other of a large variety of orientations. In some exemplary embodiments, the type of characteristic being sensed by the sensor 76 may determine the manner in which the sensor 76 is coupled, the component to which the sensor 76 is coupled, the location of the sensor 76 relative to the row unit 32, and the sensor direction.

In the illustrated exemplary embodiment, the sensor 76 is coupled to the frame 96 at a location between the opening blades 100 and the closing wheels, and is directed straight downward toward the soil. With this configuration, the sensor 76 is directed downward into a bottom of the open furrow 36 where the seeds 40 are at rest.

Figure 3:
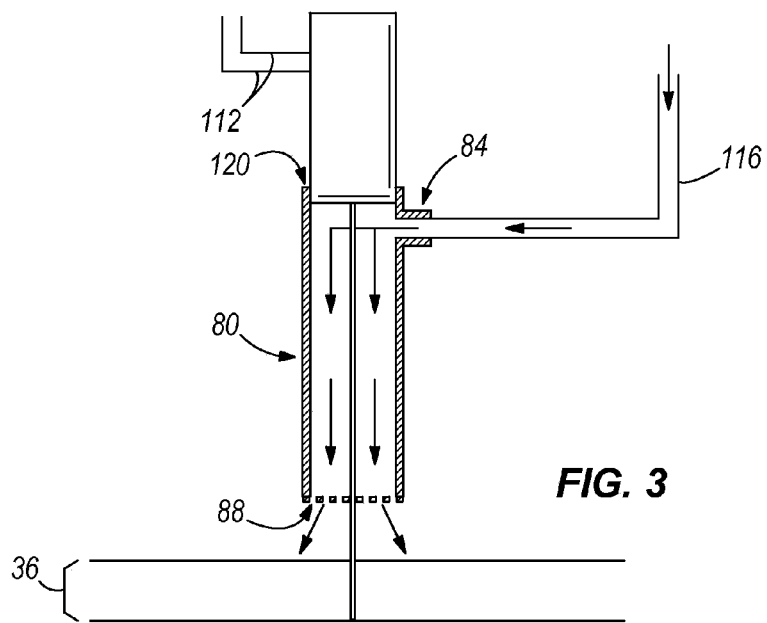
FIG. 3 is a side elevation view of an exemplary sensor, an exemplary protective member, exemplary electrical wiring, and exemplary pneumatic tubing of the system shown in FIG. 1.

Referring now to FIG. 3, the exemplary sensor 76 shown in FIG. 2 is shown with an exemplary protective member 80, exemplary electrical wires 112, and exemplary pneumatic piping 116. The exemplary illustrated embodiments of the protective member 80, electrical wiring 112, and pneumatic piping 116 are not intended to be limiting. The system 20 may include other embodiments of protective members, electrical wiring, and pneumatic piping and all of such embodiments are intended to be within the spirit and scope of the present invention.

In the illustrated exemplary embodiment, the protective member 80 has a hollow tube shape with an open top end 120 and an open bottom end 88. A bottom of the sensor 76 is positioned within and secured to the open top end 120 of the protective member 80 and the open bottom end 88 is aligned with the sensor 76 and directed downward toward the soil such that the protective member 80 does not impede the sensing capabilities of the sensor 76. The protective member 80 of the illustrated exemplary embodiment extends downward from the sensor 76 to a position disposed just above the soil. Positioning the open bottom end 88 relatively close to the soil promotes accurate readings by the sensor 76 by limiting the field of view or measured zone of the sensor 76. In this manner, soil or other distractions outside of the sensor's field of view do not bias the sensor readings. Alternatively, the protective member 80 may extend downward from the sensor 76 to a position closer to or further from the soil. The protective member 80 may also have a variety of different cross-sectional shapes, which may be defined along a plane perpendicular to a longitudinal extent of the protective member 80. For example, the protective member 80 may have a circular, triangular, square, rectangular, or any other polygonal, arcuately perimetered, or combination of straight and arcuately perimetered shape. In the illustrated exemplary embodiment, the pressurized air inlet 84 is located near a top of the protective member 80 and near the bottom end of the sensor 76. With this configuration of the pressurized air inlet 84, pressurized air, upon entering the protective member 80, immediately blows across the bottom of the sensor 76 and then downward toward the open bottom end 88 of the protective member 80 where the pressurized air exits the protective member 80. The pressurized air may dislodge debris that may have accumulated on the bottom end of the sensor 76 and exits the open bottom end 88 of the protective member 80 at a sufficient pressure to inhibit debris from entering the bottom end 88 of the protective member 80 and accessing the sensor 76. In other exemplary embodiments, the pressurized air inlet 84 may be defined in the protective member 80 at any other location.

Depending on the electrical power source relied upon to provide electrical power to the sensors 76, the electrical wiring 112 will have one end coupled to the sensor 76 and the other end coupled to the desired electrical power source (e.g., the planter electrical power source 68 or the tractor electrical power source 60). Similarly, depending on the pneumatic source relied upon to provide pressurized air to the inlet 84 of the protective member 80, the pneumatic piping 116 will have one end coupled to the protective member 80 and the other end coupled to the desired pneumatic source (e.g., the planter pneumatic source 72 or the tractor pneumatic source 56).

The following description includes several exemplary operations of the system 20. These exemplary operations are provided to assist with understanding of the system 20 of the present invention and are not intended to be limiting. The system 20 of the present invention is capable of operating in a wide variety of other manners and all of such operations are intended to be within the spirit and scope of the present invention.

In some exemplary embodiments, the system 20 is capable of determining the temperature of the soil. In such exemplary embodiments, the sensor 76 may be any type of sensor capable of sensing the temperature of the soil. Exemplary temperature sensors may include, but are not limited to, infrared sensors, laser sensors, thermal imagers, etc. It may be desirable to know the temperature of the soil at the time of planting in order to ensure the soil temperature is at the appropriate level to facilitate germination of the seeds 40. It may also be desirable to associate the soil temperature readings with a GPS position so temperature effects on crop yield may be analyzed following harvest to aid in planting decisions for the following seasons.

In such exemplary embodiments, the processing unit 44 communicates with the row unit sensors 76 and instructs each sensor 76 to take a soil temperature reading. The soil temperature readings taken by the sensors 76 are communicated to the processing unit 44. The processing unit 44 may also assign a GPS position, using the GPS 64, to each soil temperature reading and store the data pairs of soil temperature and GPS position in the memory 52 for later retrieval and analysis. Additionally, the processing unit 44 may communicate the soil temperature readings and the GPS positions to the user interface 48 where such information will be displayed for the user to view. In some exemplary embodiments, only the soil temperatures may be displayed on the user interface 48. The user may or may not alter planting operations based on the information displayed on the user interface 48.

In some exemplary embodiments, the system 20 is capable of determining the moisture content of the soil. It may be desirable to know the moisture content of the soil at the time of planting in order to ensure planting of the seeds 40 at a depth having optimum soil moisture content (or at least the best available soil moisture content), which will maximize crop yield. In such exemplary embodiments, the sensor 76 may be any type of sensor capable of sensing the required characteristics used to determine the moisture content of the soil. In one exemplary embodiment, a temperature sensor may be used to sense the temperature of the soil and the processing unit 44 may apply necessary algorithms to convert the soil temperature reading to moisture content of the soil. Exemplary temperature sensors may include, but are not limited to, infrared sensors, laser sensors, infrared imaging devices, etc. Alternative types of sensors may be used to determine the moisture content of the soil such as, for example, contact thermocouple thermometers, electrical conductivity sensors, etc. It may be desirable to associate the soil moisture content readings with a GPS position so moisture effects on crop yield may be analyzed following harvest to aid in planting decisions for the following seasons.

In exemplary embodiments where temperature sensors are utilized, the processing unit 44 communicates with the row unit sensors 76 and instructs each sensor 76 to take a soil temperature reading. The soil temperature readings taken by the sensors 76 are communicated to the processing unit 44 and the processing unit 44 may apply an algorithm to convert the soil temperature readings to soil moisture content readings. The processing unit 44 may also assign a GPS position, using the GPS 64, to each soil moisture content reading and store the data pairs of soil moisture content and GPS position in the memory 52 for later retrieval and analysis. Additionally, the processing unit 44 may communicate the soil moisture content readings and the GPS positions to the user interface 48 where such information will be displayed for the user to view. In some exemplary embodiments, only the soil moisture content may be displayed on the user interface 48. The user may or may not alter planting operations based on the information displayed on the user interface 48.

In some exemplary embodiments, the system 20 is capable of determining the presence and location of seeds 40 in the furrow 36. It may be desirable to determine the presence and location of the seeds 40 in the furrow 36 at the time of planting in order to ensure proper spacing between seeds 40, proper positioning of seeds 40 within the furrow 36, whether or not a seed 40 was deposited in the furrow 36 by the planter row unit 32 when it was intended to be deposited, and if adjacent or double seeds were deposited in a single location, etc. In such exemplary embodiments, the sensor 76 may be any type of sensor capable of sensing the required characteristics used to determine the presence and location of the seeds 40 in the furrow 36. In one exemplary embodiment, a temperature sensor may be used to sense a temperature differential between the seeds 40 and the soil. Exemplary temperature sensors may include, but are not limited to, infrared sensors, laser sensors, thermal imaging devices, etc. Alternative types of sensors may be used to determine the presence and location of seeds 40 within a furrow 36 such as, for example, visible wavelength imaging sensors, ultrasonic sensors, capacitive sensors, photoelectric sensors, luminescence sensors, contrast sensors, video cameras, color sensors (identify a difference in color between the soil and the seed), laser distance sensors (measures distance to bottom of furrow and measured distance changes when a seed moves under the sensor), etc. It may be desirable to associate the location of each seed 40 with a GPS position so seed performance may be analyzed following harvest to aid in planting decisions for the following seasons.

In exemplary embodiments where temperature sensors are utilized to detect the presence and location of seeds 40 within a furrow 36, the processing unit 44 communicates with the row unit sensors 76 and instructs each sensor 76 to take one or more temperature reading(s). If the temperature reading experiences a temperature differential, a seed 40 may be present in the measured zone and have a different temperature than the surrounding soil. If the temperature reading does not have a temperature differential and instead has a single or constant temperature reading, then a seed 40 may not be present in the measured zone and the sensor 76 may be merely measuring the temperature of the soil.

Alternatively, the sensors 76 may be continuously measuring temperatures of the soil, which will have a first temperature or a temperature within a first range. As the sensor 76 passes over a seed 40, the seed 40 may have a second temperature different than the temperature of the soil and the sensor 76 will measure this second temperature. When the sensor measures a second temperature different than the soil temperature, the system 20 detects the presence of a seed 40. The seed and soil temperature readings taken by the sensors 76 are communicated to the processing unit 44, the processing unit 44 may assign a GPS position, using the GPS 64, to each seed 40 detected by the sensors 76, and the data pairs of detected seeds and seed GPS locations are stored in the memory 52 for later retrieval and analysis. Additionally, the processing unit 44 may communicate the seed detection, seed spacing, seed location within the furrow, etc., to the user interface 48 where such information will be displayed for the user to view. Any quantity and any combination of information may be displayed on the user interface 48 for viewing by the user. The user may or may not alter planting operations based on the information displayed on the user interface 48.

In some exemplary embodiments, a natural temperature differential may exist between the seed temperature and the soil temperature and such natural temperature differential may be sufficient for detection by the sensors 76.

In other exemplary embodiments, a natural temperature differential may not exist between the seed temperature and the soil temperature, or a natural temperature differential between the seed temperature and the soil temperature may not be sufficient for detection by the sensors 76. In such exemplary embodiments, it may be desirable to heat or cool one or both of the seeds 40 and/or the soil in order to create a sufficient temperature differential that may be detected by the sensors 76. In exemplary embodiments where seeds 40 are heated, the seeds 40 may be heated by a heater at a bottom of a central seed tank or a meter housing or, if the planter includes individual seed hoppers, the seeds 40 may be heated by a heater at a bottom of seed hoppers. In such exemplary embodiments, one or more sensors 76 may be positioned to take a temperature reading of the seeds at or near a bottom of a central seed tank or meter housing, or at or near a bottom of the seed hoppers.

Figure 4:
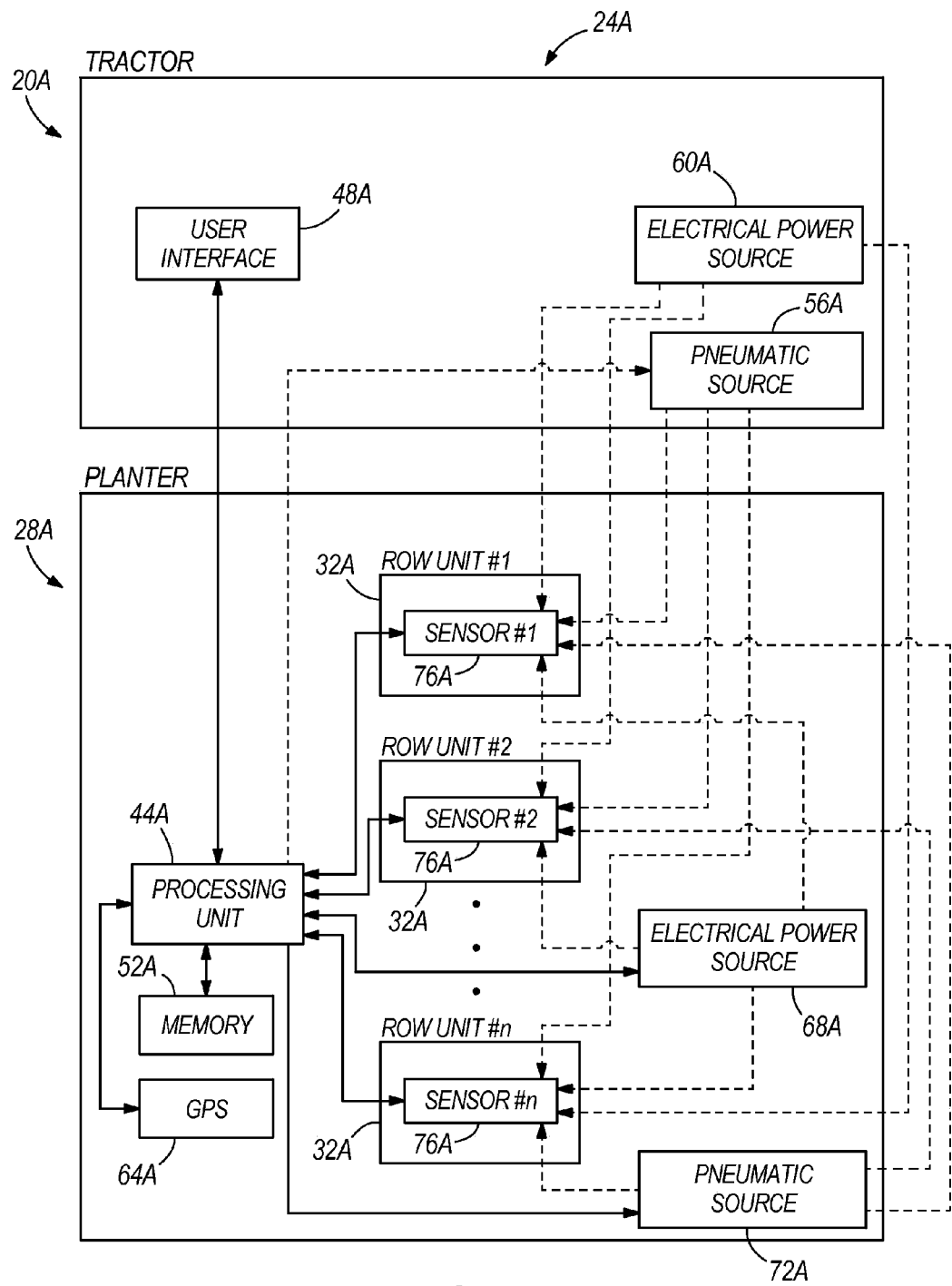
FIG. 4 is a diagram of another exemplary system for determining soil and seed characteristics.

Referring now to FIG. 4, another exemplary system 20A for determining soil and seed characteristics and analyzing the same is illustrated. The components of the system 20A illustrated in FIG. 4 that are similar to components of the system 20 illustrated in FIGS. 1-3 are identified with the same reference number and an "A".

The system 20A illustrated in FIG. 4 has many similarities to the system 20 illustrated in FIGS. 1-3. At least one difference between system 20A illustrated in FIG. 4 and system 20 illustrated in FIGS. 1-3 is that the agricultural device or planter 28A includes the processing unit 44A, the memory 52A, and the GPS 64A rather than the tractor 24A, which is the case in system 20. With the processing unit 44A included in the planter 28A, the planter electrical power source 68A may provide electrical power to the processing unit 44A. Even with this difference, the system 20A is capable of performing all the same functionality as the system 20 illustrated in FIGS. 1-3.

It should be understood that the processing unit, the memory, the GPS, and any other components of the systems may be included on either the tractor or the planter and in any combination, and be within the intended spirit and scope of the present invention. For example, the planter may include the processing unit and memory and the tractor may include the GPS. Also, for example, the tractor may include the processing unit and the memory and the planter may include the GPS.

Figure 5:
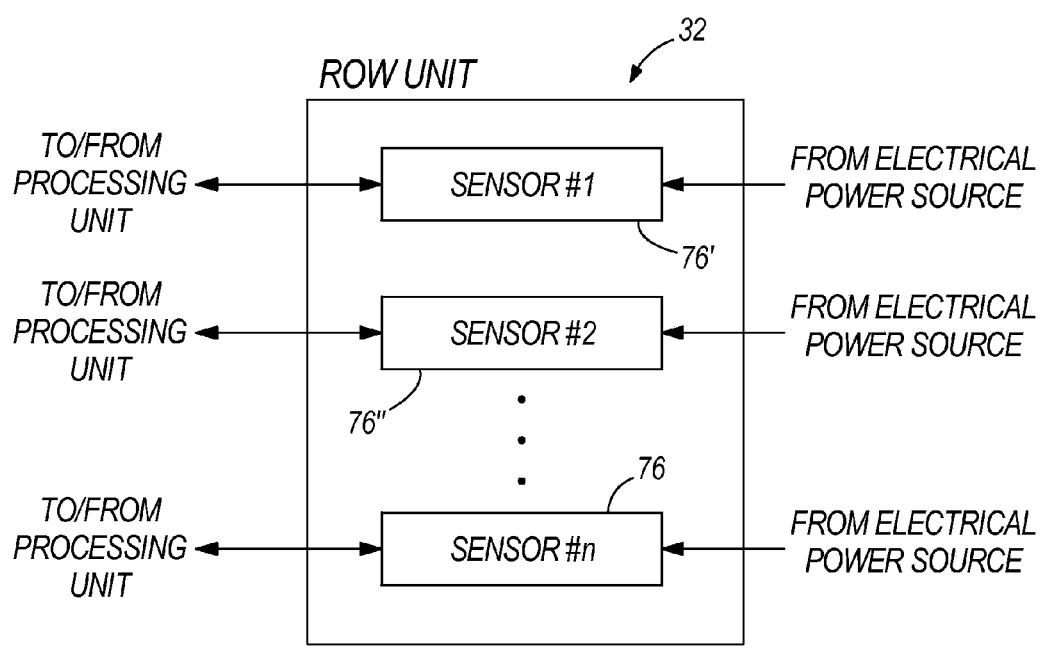
FIG. 5 is a diagram of a portion of a further exemplary system for determining soil and seed characteristics.

With reference to FIG. 5, another exemplary operation of the system 20 will be described. In this exemplary operation, each row unit 32 includes multiple sensors 76, with one sensor 76' directed toward a top, uncut surface of the soil and a second sensor 76" directed toward a bottom of the cut furrow. The first sensor 76' senses a temperature of the surface of the soil and the second sensor 76" senses a temperature at the bottom of the furrow. The processing unit 44 receives these temperatures and determines if a temperature differential exists between the surface of the soil and the bottom of the furrow. The processing unit 44 may use this temperature differential to determine the moisture of the soil and system operation may be adjusted (e.g., adjust cutting depth) based on this determination.

It should be understood that the system 20 may include sensors 76 in locations other than on the row units 32. For example, one or more sensors may be coupled to the planter 28 and one or more sensors may be coupled to the tractor 24. In addition, the system 20 may include sensors 76 on the row units and include one or more sensors on the planter 28 and/or the tractor 24. In one exemplary embodiment, one sensor 76 may be coupled to each row unit 32 and one sensor may be coupled to the planter 28 or the tractor 24. The sensors 76 coupled to the row units 32 may be directed downward toward the bottom of the furrow to sense a furrow temperature and the sensor coupled to the planter 28 or tractor 24 may be directed toward a surface of the uncut soil to sense a soil surface temperature. The processing unit 44 receives the temperature readings from the sensors, determines a temperature differential (if one exists), and determines soil moistures at each row unit 32. Operation of the system 20 may be adjusted based on the soil moistures.

The foregoing description has been presented for purposes of illustration and description, and is not intended to be exhaustive or to limit the invention to the precise form disclosed. The descriptions were selected to explain the principles of the invention and their practical application to enable others skilled in the art to utilize the invention in various embodiments and various modifications as are suited to the particular use contemplated. Although particular constructions of the present invention have been shown and described, other alternative constructions will be apparent to those skilled in the art and are within the intended scope of the present invention.

What is claimed is:

1. A control and monitoring system for an agricultural planting system comprising a plurality of row units each including a furrow opener, the control and monitoring system comprising:

a processing unit;

a solid state sensor in communication with the processing unit and adapted to sense a characteristic associated with seed planting, wherein the solid state sensor generates a signal associated with the sensed characteristic and the processing unit receives the signal; and a memory associated with the processing unit, said memory storing a data pair comprising the sensed characteristic and a GPS position of the sensed characteristic, and wherein the data pair is used for analysis and later retrieval for planting;

said signal being associated with planting a first seed and used to plant a subsequent seed;

wherein said sensed characteristic comprises a soil characteristic.

2. The control and monitoring system of claim 1, further comprising a user interface in communication with the processing unit, the user interface adapted to display information associated with the sensed characteristic.

3. The control and monitoring system of claim 2, wherein the characteristic comprises a soil characteristic within a furrow created by the furrow opener.

4. The control and monitoring system of claim 3, wherein the characteristic is one of a soil temperature or a soil moisture content.

5. The control and monitoring system of claim 3, wherein the characteristic is both a soil temperature and a soil moisture content.

6. The control and monitoring system of claim 2, wherein the characteristic is a characteristic of a seed.

7. The control and monitoring system of claim 6, wherein the characteristic is one of a seed temperature and a seed presence.

8. The control and monitoring system of claim 1, further comprising a UPS system operatively connected to the processing unit and configured to position to each characteristic with the GPS position.

9. The control and monitoring system of claim 8, wherein the memory is located remote of the agricultural planting system.

10. The control and monitoring system of claim 1, wherein the solid state sensor is a first sensor, the characteristic is a first characteristic, and the signal is a first signal, the agricultural seed planting system further comprising a second sensor adapted to sense a second characteristic associated with seed planting, wherein the second sensor generates a second signal associated with the sensed second characteristic and communicates with the processing unit such that the processing unit receives the second signal, the second sensor being a solid state sensor.

11. The control and monitoring system of claim 10, wherein the first characteristic is a soil characteristic and the second characteristic is a seed characteristic.

12. The control and monitoring system of claim 10, wherein the first and second characteristics are one of both soil characteristics or both seed characteristics.

13. A method of planting seeds in a furrow in soil with an agricultural planter having a plurality of row units each including a furrow opener, the method comprising:
sensing a first characteristic at an uncut position of soil with a first solid state sensor;
sensing a second characteristic at a lower portion of the furrow in the soil with a second solid state sensor;
determining a difference in the first and second characteristics with a processing unit to compare the difference with an accepted range; and
using the comparison to change a planting operation if the comparison is outside the accepted range.

14. The method of claim 13, wherein the planting operation comprises the depth of the furrow for planting seed.

15. The method of claim 13, further comprising:
generating a first signal associated with the sensed characteristic with the first solid state sensor;
communicating the first signal to a processing unit;
storing information associated with the first signal in a memory; and
retrieving the information from the memory subsequent to storing the information.

16. The method of claim 15, further comprising:
generating a second signal associated with the sensed second characteristic with the second solid state sensor;
communicating the second signal to the processing unit;
storing information associated with the second signal in the memory; and
retrieving the information from the memory associated with both signals subsequent to storing the information.

17. The method of claim 16, wherein the difference is determined from the retrieved information.

18. The method of claim 13, wherein sensing further includes sensing one of a soil characteristic and a seed characteristic.

19. The method of claim 13, further comprising displaying the difference on a user interface to manually change the planting operation.

20. The method of claim 13, further comprising automatically changing the planting operation based upon the characteristics.

* * * * *

UNITED STATES PATENT AND TRADEMARK OFFICE
CERTIFICATE OF CORRECTION

PATENT NO. : 9,743,578 B2
APPLICATION NO. : 14/566790
DATED : August 29, 2017
INVENTOR(S) : Laura B. Blomme and Courtney N. Achen It is certified that error appears in the above-identified patent and that said Letters Patent is hereby corrected as shown below:

In the Claims

In Column 11, Claim 8, Line 20:
DELETE "UPS" before the word system
INSERT --GPS-- before the word system Signed and Sealed this
Twelfth Day of December, 2017

Joseph Matal
*Performing the Functions and Duties of the*
*Under Secretary of Commerce for Intellectual Property and*
*Director of the United States Patent and Trademark Office*